United States Patent
Bessho et al.

(10) Patent No.: US 10,573,871 B2
(45) Date of Patent: Feb. 25, 2020

(54) POWER SUPPLY DEVICE AND BUS BAR FOR BATTERY CELL

(71) Applicant: SANYO Electric Co., Ltd., Osaka (JP)

(72) Inventors: Toshihiko Bessho, Tokyo (JP); Kenichi Imai, Hyogo (JP)

(73) Assignee: SANYO ELECTRIC CO., LTD., Osaka (JP)

( * ) Notice: Subject to any disclaimer, the term of this patent is extended or adjusted under 35 U.S.C. 154(b) by 56 days.

(21) Appl. No.: 15/579,627

(22) PCT Filed: Jul. 11, 2016

(86) PCT No.: PCT/JP2016/003271
§ 371 (c)(1),
(2) Date: Dec. 5, 2017

(87) PCT Pub. No.: WO2017/017915
PCT Pub. Date: Feb. 2, 2017

(65) Prior Publication Data
US 2018/0151862 A1 May 31, 2018

(30) Foreign Application Priority Data
Jul. 30, 2015 (JP) ................................. 2015-150283

(51) Int. Cl.
*H01M 2/20* (2006.01)
*H01M 2/10* (2006.01)
*H01M 2/30* (2006.01)

(52) U.S. Cl.
CPC ......... *H01M 2/206* (2013.01); *H01M 2/1077* (2013.01); *H01M 2/30* (2013.01)

(58) Field of Classification Search
None
See application file for complete search history.

(56) References Cited

U.S. PATENT DOCUMENTS

| | | | |
|---|---|---|---|
| 7,736,796 B2 * | 6/2010 | Nagatani | H01M 2/204 429/158 |
| 2009/0274956 A1 * | 11/2009 | Kosugi | H01M 2/202 429/158 |

(Continued)

FOREIGN PATENT DOCUMENTS

| | | |
|---|---|---|
| JP | 2009-087761 | 4/2009 |
| JP | 2010-176997 | 8/2010 |

(Continued)

OTHER PUBLICATIONS

International Search Report of PCT application No. PCT/JP2016/003271 dated Oct. 11, 2016.

*Primary Examiner* — Devina Pillay
(74) *Attorney, Agent, or Firm* — Wenderoth, Lind & Ponack L.L.P.

(57) ABSTRACT

A power supply device includes: a bus bar which connects the electrode terminals facing each other. The bus bar includes: a first connection portion which is connected to one of the electrode terminals; a second connection portion which is connected to another of the electrode terminals; a first rising portion which is coupled to the first connection portion through a first bent portion; a second rising portion which is coupled to the second connection portion through a second bent portion, and is disposed in an orientation of crossing the first rising portion; and a middle linking portion which is coupled to the first rising portion through a third bent portion facing the first bent portion, and the second rising portion through a fourth bent portion facing the second bent portion.

13 Claims, 8 Drawing Sheets

(56) References Cited

U.S. PATENT DOCUMENTS

| | | | |
|---|---|---|---|
| 2010/0190050 A1 | 7/2010 | Ochi | |
| 2013/0200700 A1* | 8/2013 | Ohkura | H01M 2/206 307/10.7 |
| 2013/0252075 A1 | 9/2013 | Shimizu et al. | |
| 2015/0140393 A1* | 5/2015 | Yamamoto | H01M 2/1077 429/121 |
| 2016/0329545 A1* | 11/2016 | Zhang | H01R 13/533 |

FOREIGN PATENT DOCUMENTS

| | | |
|---|---|---|
| JP | 2013-197017 | 9/2013 |
| WO | 2011/105095 | 9/2011 |

\* cited by examiner

POWER SUPPLY DEVICE AND BUS BAR FOR BATTERY CELL

This application is a U.S. national stage application of the PCT International Application No. PCT/JP2016/003271 filed on Jul. 11, 2016, which claims the benefit of foreign priority of Japanese patent application 2015-150283 filed on Jul. 30, 2015, the contents all of which are incorporated herein by reference.

TECHNICAL FIELD

The present invention relates to a power supply device and a bus bar for electrically connecting battery cells used in this.

BACKGROUND ART

A power supply device using a secondary battery has been used for a power supply for driving a vehicle, for example. The power supply device mentioned above is provided with a plurality of battery cells 91, a plurality of separators 92, a pair of bind bars 95, and a pair of end plates 94, as illustrated in an exploded perspective view in FIG. 8. Each of separators 92 is interposed between adjacent battery cells 91. Battery cells 91 and separators 92 are stacked in an alternating fashion to form battery stacked body 99. Both end faces of battery stacked body 99 in the stacking direction of battery cells 91 are respectively covered by end plates 94. Respective bind bars 95 extend along the stacking direction of battery cells 91, and are fixed to end plates 94 on both ends of battery stacked body 99. In the power supply device mentioned above, electrode terminals 93 of battery cells 91 are electrically connected each other through bus bars 97. The bus bar is configured of metal board having excellent conductivity.

Since members of the battery cells or the like constituting the power supply device include manufacturing allowance, distances between the electrode terminals adjacently disposed are not necessarily constant, and therefore it is necessary to absorb dispersion of these. Further, in a case where the power supply device receives outer force, it happens that the battery cells adjacently disposed are relatively misaligned. In this case, in order to absorb the misalignment through the bus bar, it is required that the bus bar has flexibility capable of being resiliently deformed.

As the way where the bus bar has flexibility, the bus bar in which bending processing is carried out, has been known (refer to Unexamined Japanese Patent Publication No. 2013-197017, for example). However, in the conventional configuration, the bent portion for buffering stress is disposed between two connection parts connected to the electrode terminals. In this shape, in a case where size between terminals of adjacent cells is short, there is a problem that forming the bus bar (press working) becomes difficult.

SUMMARY OF THE INVENTION

The present invention has been accomplished to solve such conventional problems. One of objects of the present invention is to supply with a power supply device and a bus bar for a battery cell which enhance flexibility of the bus bar and improve reliability, According to one aspect of the present invention, power supply device 100 has a plurality of battery cells 1 each having a positive electrode terminal 13 and a negative electrode terminal 13, and bus bars 7 which electrically connects the electrode terminals 13 facing each other in battery cells 1 adjacently disposed among the plurality of battery cells 1. Bus bar 7 includes: a first connection portion 71 which is connected to one of the electrode terminals 13; a second connection portion 72 which is connected to another of the electrode terminals 13; a first rising portion 73 which is coupled to the first connection portion 71 through a first bent portion 81; a second rising portion 75 which is coupled to the second connection portion 72 through a second bent portion 84, and is disposed in an orientation of crossing the first rising portion 73; and a middle linking portion 74 which is coupled to the first rising portion 73 through a third bent portion 82 facing the first bent portion 81, and the second rising portion 75 through a fourth bent portion 83 facing the second bent portion 84.

According to the above-mentioned configuration, the bus bar connecting the facing electrode terminals, has three-dimensional coupling structure having the first rising portion, the middle linking portion, and the second rising portion via the bent portions, between the first connection portion and the second connection portion connected to the facing electrode terminals. Therefore, a distance between the first connection portion and the second connection portion can be decreased, and downsizing of the bus bar having flexibility can be done. Also, since this bus bar can absorb displacement of three directions of X axis, Y axis, and Z axis, high flexibility can be realized.

According to the power supply device of the present invention, the bus bar 7 has a thickness of 0.8 mm or more and 2.0 mm or less, at least at the first bent portion 81, the second bent portion 84, the third bent portion 82, and the fourth bent portion 83. According to the above-mentioned configuration, strength of the whole of the bus bar can be kept, and then each of the bent portions can be easily deformed. Further, displacement of the pair of electrode terminals connected to the bus bar, can be effectively absorbed.

According to the power supply device of the present invention, each of the battery cells 1 is a rectangular battery which has a thickness smaller than a width. In the bus bar 7, the first connection portion 71 and the second connection portion 72 are disposed in a substantially same plane, and the middle linking portion 74 is disposed in a plane substantially parallel to the first connection portion 71 and the second connection portion 72. The first rising portion 73 has a board shape which extends in a direction of the thicknesses of the battery cells 1, and is coupled along one end of the first connection portion 71 in a vertical orientation. The second rising portion 75 has a board shape which extends in a direction of the widths of the battery cells 1, and is coupled along a facing edge facing the first connection portion 71 at a side edge of the second connection portion 72 in a vertical orientation.

According to the above-mentioned configuration, since the first rising portion in a vertical orientation, which extends in a direction of the thicknesses of the battery cells, is coupled between the first connection portion and the middle linking portion via the first bent portion and the third bent portion, displacement of the first connection portion and the second connection portion in the width direction of the battery cell (X axis direction) can be absorbed. Additionally, since the second rising portion in a vertical orientation, which extends in a direction of the widths of the battery cells, is coupled between the first connection portion and the middle linking portion via the second bent portion and the fourth bent portion, displacement of the first connection portion and the second connection portion in the thickness direction of the battery cell (Y axis direction) can be absorbed. Further, the middle linking portion in a horizontal orientation parallel to the first connection portion and the second connection portion, is coupled between the first rising portion and the second rising portion via the third bent portion and the fourth bent portion which cross each other. Therefore, displacement of the first connection portion and the second connection portion in the vertical direction (Z axis direction), can be absorbed.

According to the power supply device of the present invention, in the bus bar 7, the second connection portion 72 has an extending portion 80 which projects along a facing edge facing the first connection portion 71, and the second rising portion 75 extends along the extending portion 80.

According to the power supply device of the present invention, the bus bar 7 has a connecting terminal 78 which projects from one end of the second connection portion 72.

According to the power supply device of the present invention, the battery cells 1 are rectangular batteries, and each of the battery cells 1 has a first electrode terminal 13A as the positive electrode terminal 13 and a second electrode terminal 13B as the negative electrode terminal 13 at both of end portions of an upper surface of each of the battery cells 1. The plurality of the rectangular batteries are disposed in a stacked state, and the first electrode terminal 13A is connected to the first connection portion 71 and the second electrode terminal 13B is connected to the second connection portion 72 at the end portion of each of the battery cells 1 adjacently disposed, and thereby the plurality of the battery cells 1 are connected in series through the bus bar 7.

According to the power supply device of the present invention, in the bus bar 7, the first connection portion 71 and the second connection portion 72 have through holes 76 in which the first electrode terminal 13A and the second electrode terminal 13B are inserted respectively, and the first connection portion 71 and the second connection portion 72 are respectively connected by welding to the first electrode terminal 13A and the second electrode terminal 13B.

According to the power supply device of the present invention, the middle linking portion 74 includes a flat surface which is pressed by a jig in a case where the first connection portion 71 and the second connection portion 72 are welded. According to the above-mentioned configuration, the flat surface of the middle linking portion is pressed by a jig, and thereby the first connection portion and the second connection portion can be welded, while coming in close contact with the electrode terminals.

According to the power supply device of the present invention, the bus bar 7 is made of aluminum or aluminum alloy. According to the above-mentioned configuration, the bus bar is made of metal which is relatively easily deformed, such as aluminum, or aluminum alloy, and thereby displacement of the pair of electrode terminals can be effectively absorbed.

According to the power supply device of the present invention, in the bus bar 7, the first connection portion 71 and the second connection portion 72 are made of different metal materials, and the bus bar 7 is a clad material where the first connection portion 71 and the second connection portion 72 are connected.

According to the power supply device of the present invention, the battery cells 1 are rectangular batteries, and each of the battery cells 1 has a first electrode terminal 13A as the positive electrode terminal 13 and a second electrode terminal 13B as the negative electrode terminal 13 at both of end portions of an upper surface of each of the battery cells 1, and the first electrode terminal 13A is made of aluminum, and the second electrode terminal 13B is made of copper. Further, in the bus bar 7, the first connection portion 71 is made of aluminum, and the second connection portion 72 is made of copper.

According to the power supply device of the present invention, a separator 2 having insulation property which is interposed between the secondary battery cells 1 adjacently disposed in a state where the plurality of secondary battery cells 1 are stacked. The separator 2 has an insulating wall 15 which is disposed between the first electrode terminal 13A and the second electrode terminal 13B connected each other through the bus bar 7, and the insulating wall 15 is formed so as to be higher than the electrode terminals 13 and lower than the middle linking portion 74.

According to the power supply device of the present invention, separators 2 having insulation property which are interposed between the secondary battery cells 1 adjacently disposed in a state where the plurality of secondary battery cells 1 are stacked. In one among the separators 2 which is disposed between the bus bars 7 adjacently disposed, has an insulating wall 15, and the insulating wall 15 is formed so as to be higher than the bus bars 7.

According to the power supply device of the present invention, the insulating wall 15 has a holding rib 16 which holds the middle linking portion 74 in one of the bus bars 7 by contacting an under surface of the middle linking portion 74. According to the above-mentioned configuration, the holding portion holds the undersurface of the middle linking portion, and thereby the middle linking portion can be positioned and disposed at the fixed location. Especially, in a case where the middle linking portion is pressed by a jig, the bus bar can be easily welded since the holding portion holds the bus bar.

According to a bus bar for a battery cell of the present invention, the bus bar for connecting the positive and negative electrode terminals 13 facing each other in the battery cells 1 adjacently disposed among the plurality of battery cells 1, includes: a first connection portion 71 which is connected to one of the electrode terminals 13; a second connection portion 72 which is connected to another of the electrode terminals 13; a first rising portion 73 which is coupled to the first connection portion 71 through a first bent portion 81; a second rising portion 75 which is coupled to the second connection portion 72 through a second bent portion 84, and is disposed in an orientation of crossing the first rising portion 73; and a middle linking portion 74 which is coupled to the first rising portion 73 through a third bent portion 82 facing the first bent portion 81, and the second rising portion 75 through a fourth bent portion 83 facing the second bent portion 84.

According to the above-mentioned configuration, three-dimensional coupling structure having the first rising portion, the middle linking portion, and the second rising portion via the bent portions, between the first connection portion and the second connection portion connected to the facing electrode terminals. Therefore, a distance between the first connection portion and the second connection portion can be decreased, and downsizing of the bus bar having flexibility can be done. Also, since this bus bar can absorb displacement of three directions of X axis, Y axis, and Z axis, high flexibility can be realized.

DESCRIPTION OF EMBODIMENT

Figure 1:
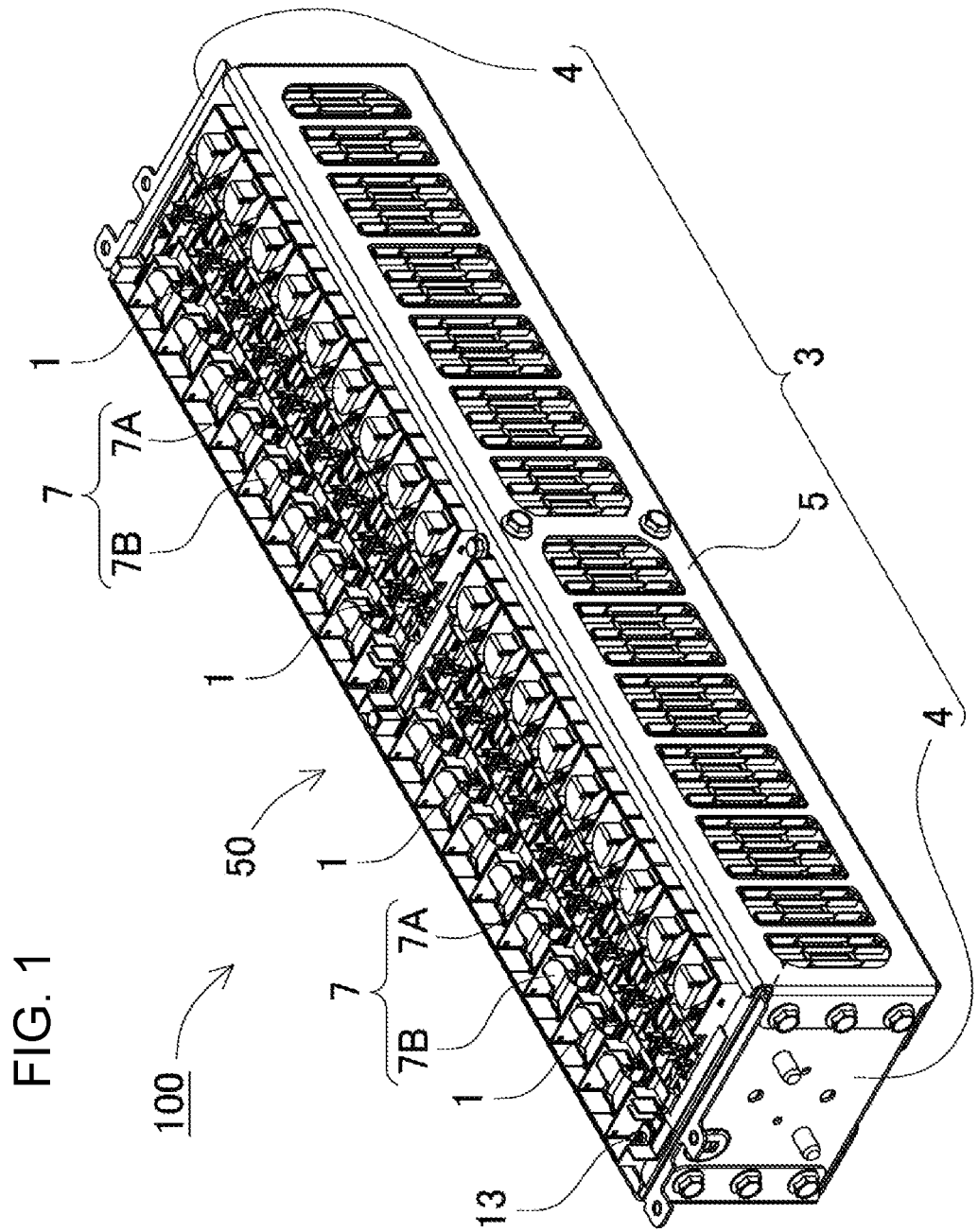
FIG. 1 is a perspective view of a power supply device according to one exemplary embodiment of the present invention.

Power supply device 100 shown in FIGS. 1 to 5 has a plurality of battery cells 1 each having a positive electrode terminal 13 and a negative electrode terminal 13, and bus bars 7 which connects the electrode terminals 13 facing each other in battery cells 1 adjacently disposed among the plurality of battery cells 1.

(Battery Cell 1)

Battery cell 1 is a prismatic battery with wide main surface having a rectangular outer shape, and has a thickness smaller than the width. Battery cell 1 is also a secondary battery which can be charged and discharged, and it is a lithium ion secondary battery. However, in the power supply device according to the present invention, the battery cell is not limited to the lithium ion secondary battery. As the battery cell, any other batteries which can be charged and discharged can also be used, such as a non-aqueous electrolyte secondary battery or a nickel-hydrogen battery cell other than the lithium ion secondary battery.

Battery cell 1 is configured such that outer can 1a which stores an electrode assembly formed by stacking positive and negative electrode plates is filled with an electrolyte, and is sealed in an airtight manner. Outer can 1a is molded into a columnar shape with a closed bottom, and an upper opening thereof is closed in an airtight manner by sealing plate 1b formed from a metal plate. Outer can 1a is formed by deep-drawing a metal plate made of aluminum, aluminum alloy, or the like. Sealing plate 1b is formed from a metal plate made of aluminum, aluminum alloy, or the like, in the same manner as outer can 1a. Sealing plate 1b is inserted into the opening of outer can 1a, and the boundary between the outer periphery of sealing plate 1b and the inner periphery of outer can 1a is irradiated with a laser beam to fix sealing plate 1b to outer can 1a in an airtight manner by laser welding.

(Electrode Terminal 13)

Battery cell 1 is provided with positive and negative electrode terminals 13 fixed on both ends of sealing plate 1b as the upper surface. Each of battery cells 1 shown in figures has first electrode terminal 13A as positive electrode terminal 13 and second electrode terminal 13B as negative electrode terminal 13. Positive and negative electrode terminals 13 are not made of the same metal material, but made of different metal materials. In the lithium ion secondary battery, first electrode terminal 13A as the positive electrode is made of aluminum, and second electrode terminal 13B as the negative electrode is made of copper.

As shown in the figures, first electrode terminal 13A and second electrode terminal 13B are fixed to sealing plate 1b through insulating member 14, and are respectively connected to the incorporated positive and negative electrode plates (not shown). In positive and negative electrode terminals 13, welding surface 13b is provided at the periphery of projecting portion 13a. Welding surface 13b has a plane shape parallel to the outer surface of sealing plate 1b, and projecting portion 13a is provided at the central portion of this welding surface 13b. Electrode terminal 13 shown in the figures, has a cylindrical shape of projecting portion 13a. Here, the projecting portion is not necessarily of the cylindrical shape, but may be of a polygonal column shape or an elliptic cylinder shape.

Positive and negative electrode terminals 13 fixed on sealing plate 1b of battery cell 1 are provided such that the positive electrode and the negative electrode are bilaterally symmetrical. Thus, battery cells 1 can be connected in series in such a way that they are horizontally reversed and stacked on each other, and the adjacent positive electrode terminal 13 and the negative electrode terminal 13 are connected to each other with bus bar 7. The power supply device obtained by connecting battery cells 1 in series can increase an output voltage to increase an output. Notably, the power supply device can be configured such that the battery cells are connected in parallel and in series.

(Battery Block 50)

Figure 3:
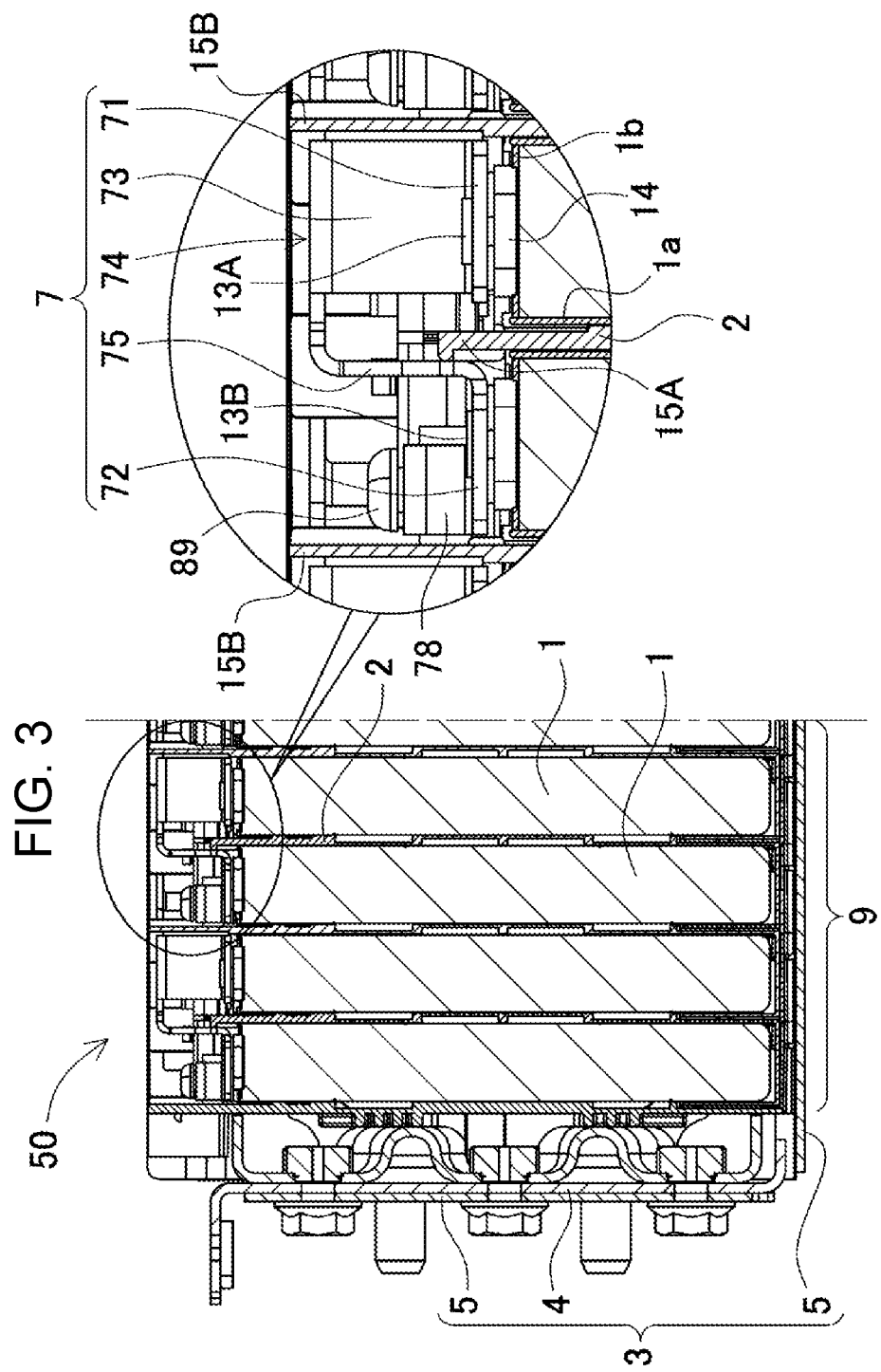
FIG. 3 is a sectional view of the power supply device illustrated in FIG. 2 taken along line III-III, a portion of which is enlarged.

As shown in FIG. 3, battery stacked body 9 is formed such that the plurality of battery cells 1 are stacked in a state of interposing separators 2 between the adjacent battery cells 1. Rectangular parallelepiped battery block 50 is formed by fixing battery stacked body 9 via fastening member 3. As shown in FIG. 1, fastening member 3 includes end plates 4 disposed on both end faces of stacked battery stacked body 9 and bind bar 5 that fixes stacked battery cells 1 in a pressurized state with both ends being fixed to end plates 4.

In battery stacked body 9, battery cells 1 are stacked such that the surfaces having electrode terminals 13 of battery cells 1, that is, sealing plates 1b in the figures, are disposed in the same plane. In power supply device 100 shown in FIGS. 1 to 3, positive and negative electrode terminals 13 are disposed on the upper surface of battery stacked body 9. In battery stacked body 9, battery cells 1 are stacked in a state where positive and negative electrode terminals 13 at both end portions of sealing plates 1b are arranged alternatively and horizontally reversed.

(Bus Bar 7)

Figure 2:
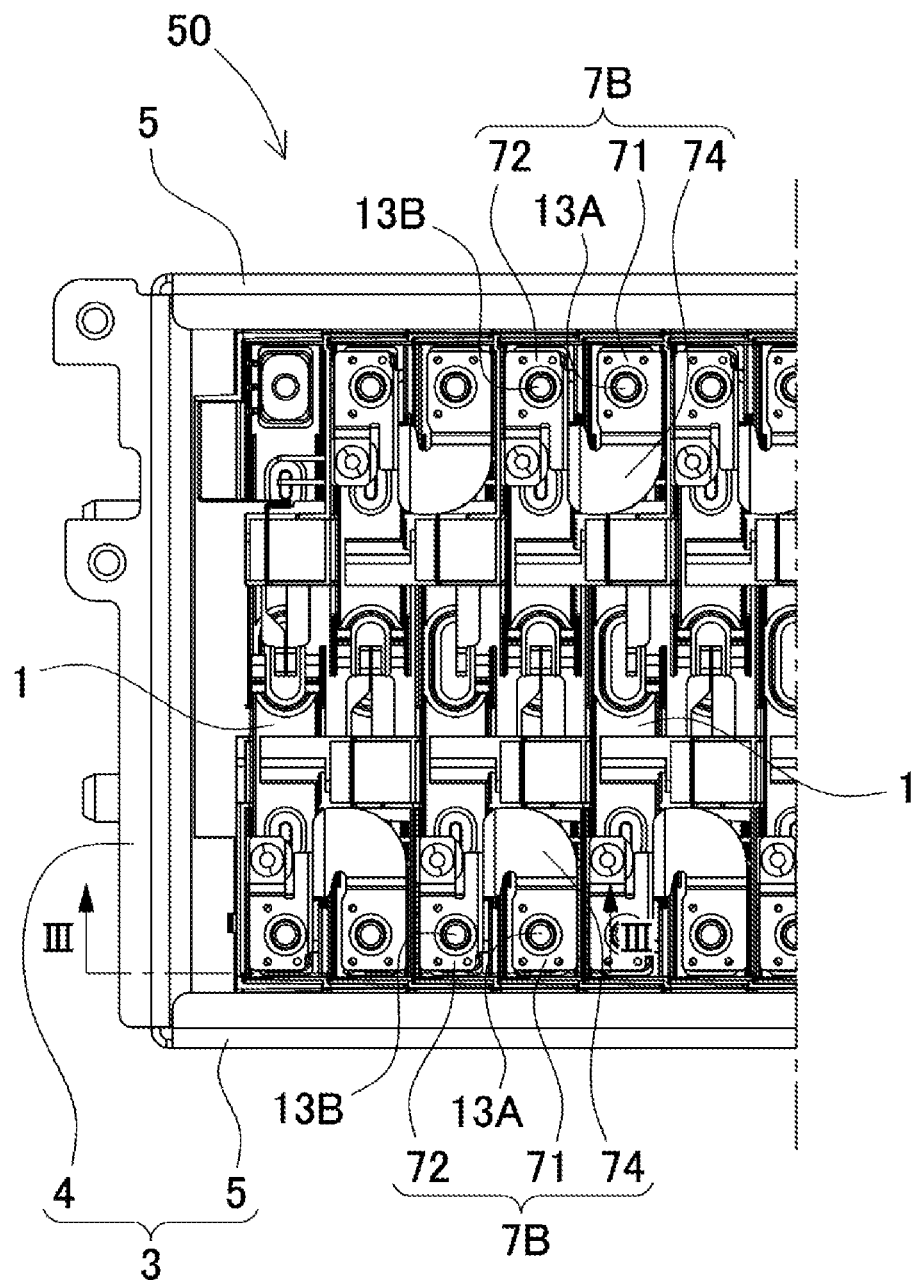
FIG. 2 is an enlarged plan view of the power supply device illustrated in FIG. 1.
Figure 6:
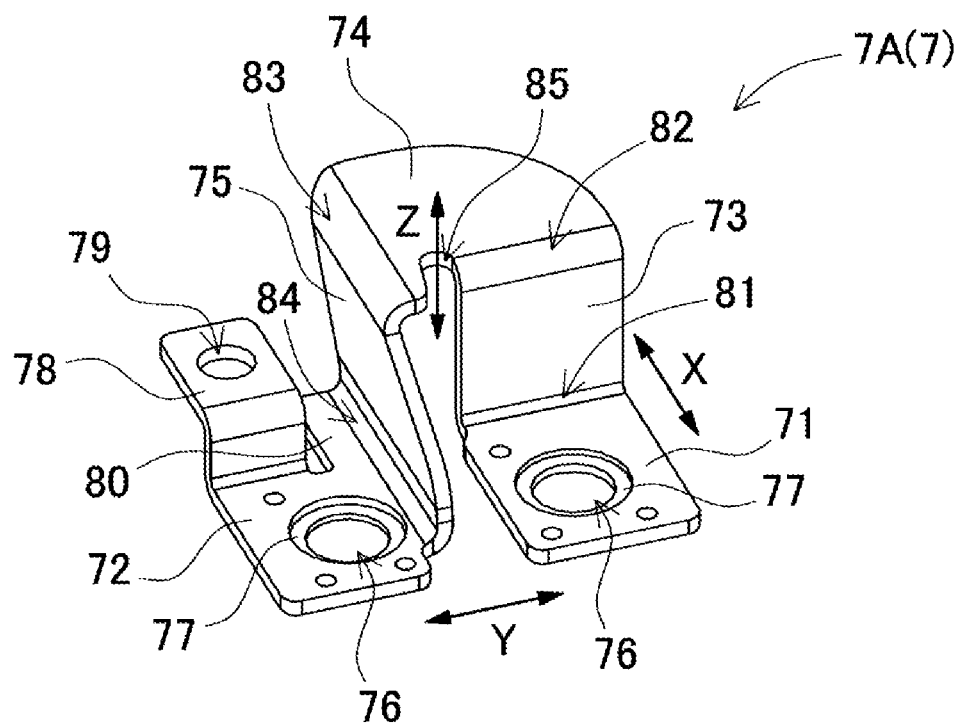
FIG. 6 is an enlarged perspective view illustrating a first bus bar.
Figure 7:
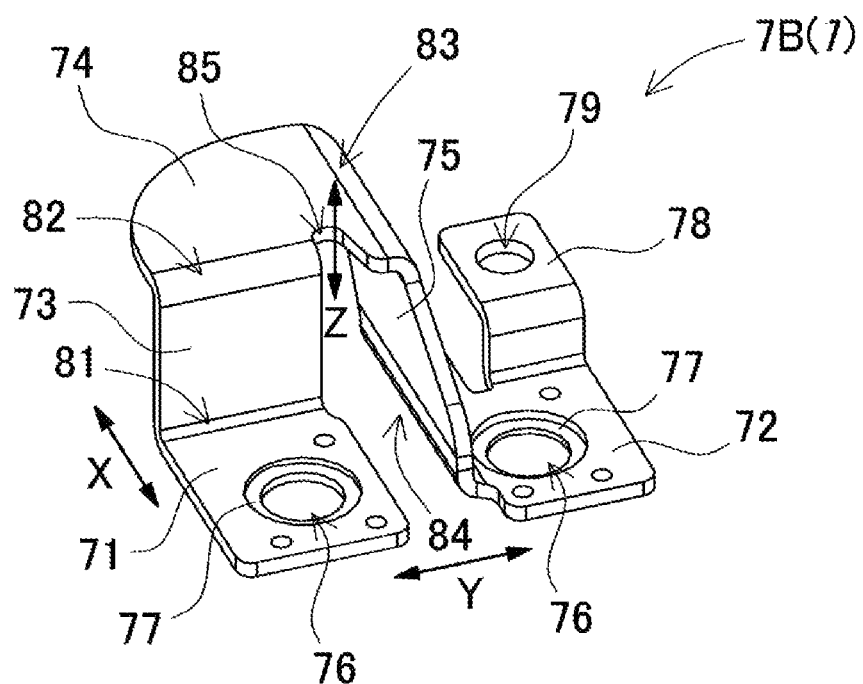
FIG. 7 is an enlarged perspective view illustrating a second bus bar.
Figure 8:
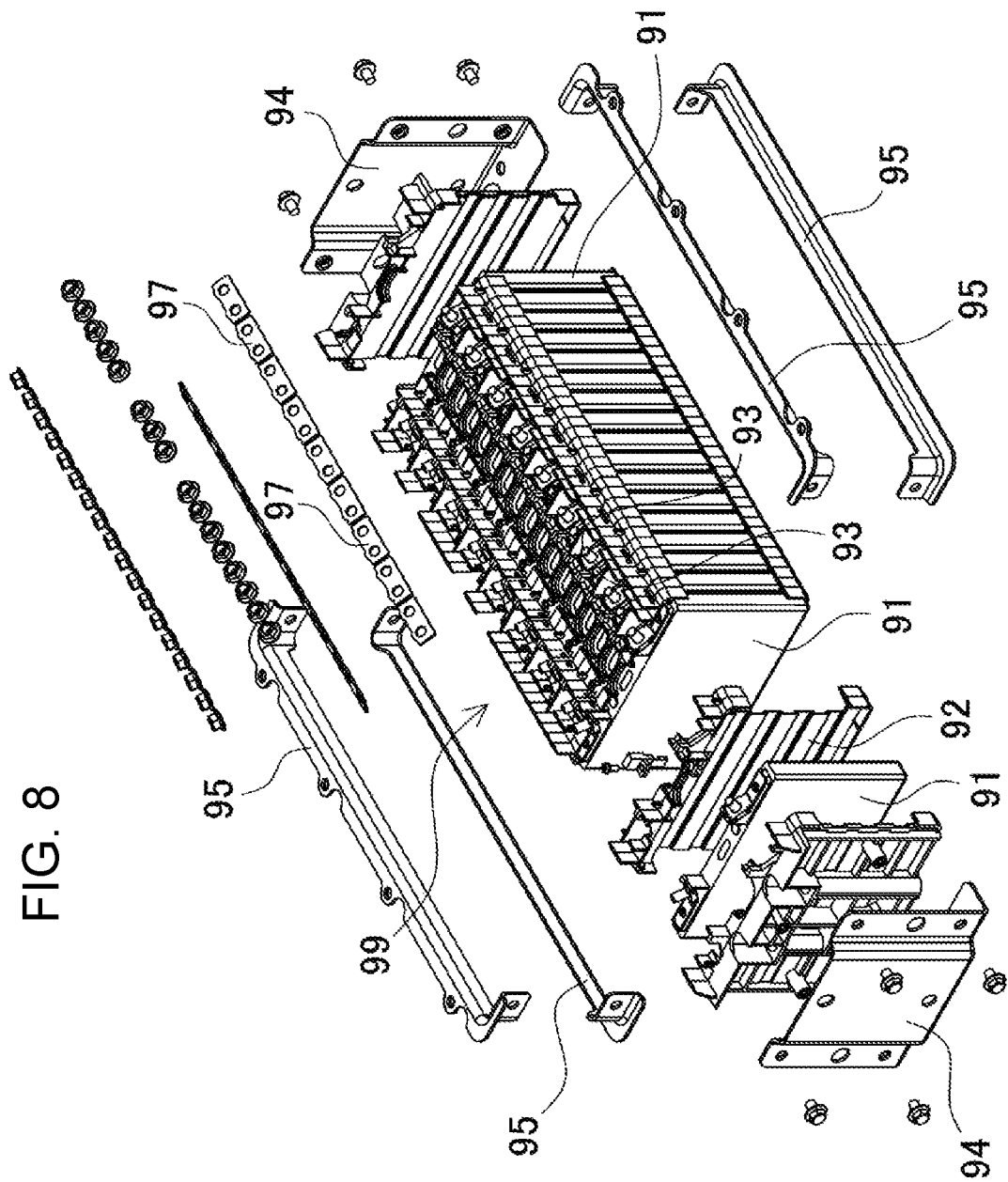
FIG. 8 is an exploded perspective view of a conventional power supply device.

As shown in FIG. 2, in battery block 50, the plurality of battery cells 1 are disposed in a stacked state. At the end portion of battery cells 1 adjacently disposed, first electrode terminal 13A and second electrode terminal 13B are electrically connected via the bus bar. In the power supply device shown in the figures, the plurality of battery cells 1 are connected in series via bus bars 7. Power supply device 100 shown in FIG. 2, has first bus bar 7A and second bus bar 7B which are formed bilaterally symmetrical each other at both side portions of battery block 50, in order to connect, in series via bus bar 7, first electrode terminal 13A and second electrode terminal 13B which face to each other. Here, as shown in FIGS. 6 and 7, first bus bar 7A and second bus bar 7B are bilaterally symmetrical in a plan view and a front view, and are mirror images to each other. Accordingly, the like configuration elements of first bus bar 7A and second bus bar 7B are explained with the like reference marks.

Bus-bar 7 is formed by bending a metal board. Bus bars 7 shown in FIGS. 6 and 7 each include: a first connection portion 71 which is connected to first electrode terminal 13A as one of the electrode terminals 13; a second connection portion 72 which is connected to second electrode terminal 13B as another of the electrode terminals 13; a first rising portion 73 which is coupled to the first connection portion 71 through a first bent portion 81; a second rising portion 75 which is coupled to the second connection portion 72 through a second bent portion 84, and is disposed in an orientation of crossing the first rising portion 73; and a middle linking portion 74 which is coupled to the first rising portion 73 through a third bent portion 82 facing the first bent portion 81, and the second rising portion 75 through a fourth bent portion 83 facing the second bent portion 84.

First connection portion 71 and second connection portion 72 have flat shapes of a rectangular outer appearance respectively, and are disposed in a substantially same plane. First connection portion 71 and second connection portion 72 have through holes 76 in which first electrode terminal 13A and second electrode terminal 13B are inserted respectively. First electrode terminal 13A and second electrode terminal 13B are inserted respectively into through holes 76 of first connection portion 71 and second connection portion 72, and first connection portion 71 and second connection portion 72 are respectively connected by welding to first electrode terminal 13A and second electrode terminal 13B. Bus bars 7 shown in FIGS. 6 and 7 each have through hole 76 of a circular shape, and then projecting portion 13a are inserted inside through hole 76. Circular through hole 76 has an inner shape which can guide projecting portion 13a of electrode terminal 13. Further, in a state where projecting portion 13a is guided into through hole 76, a gap is made between projecting portion 13a and an inside edge of through hole 76, and then welding surface 13b of electrode terminal 13 is exposed.

First connection portion 71 and second connection portion 72 each have contacting surface 77 at a peripheral edge portion of through hole 76, which is welded to welding surface 13b of electrode terminal 13. This contacting surface 77 is formed in a ring shape, and the thickness of contacting surface 77 is smaller than that of first connection portion 71 or second connection portion 72. Contacting surface 77 has the thickness through which contacting surface 77 is surely welded by laser to welding surface 13b of electrode terminal 13. The thickness of contacting surface 77 is set at a size through which contacting surface 77 is surely welded to welding surface 13b by irradiating laser beam to the surface. The thickness of contacting surface 77 is 0.3 mm or more, preferably 0.4 mm or more, for example. In a case where it is too thick, it is necessary to increase energy of laser welding. Therefore, the thickness of contacting surface 77 is 2 mm or less, preferably 1.6 mm or less, for example.

First rising portion 73 is coupled to first connection portion 71 in a vertical rising orientation. First rising portion 73 has a board shape which extends in a direction of the thicknesses of battery cells 1, and is coupled along one end of first connection portion 71 in a vertical orientation. First rising portion 73 is coupled to first connection portion 71 through first bent portion 81 at the boundary to first connection portion 71.

Second rising portion 75 is coupled to second connection portion 72 in a vertical rising orientation. Second rising portion 75 has a board shape which extends in a direction of the widths of battery cells 1, and is coupled along a facing edge facing first connection portion 71 at a side edge of the second connection portion 72 in a vertical orientation. Second connection portion 72 has extending portion 80 which projects along a facing edge facing the first connection portion 71, and second rising portion 75 extends along extending portion 80. Second rising portion 75 shown in the figures, has a trapezoid shape in which the height is gradually increased from a tip end side (front side in the figures) of second connection portion 72 to a rear end side (rear side in the figures). Second rising portion 75 is coupled to second connection portion 72 through second bent portion 84 at the boundary to second connection portion 72.

Middle linking portion 74 has a plat surface shape, and is disposed in a plane substantially parallel to first connection portion 71 and second connection portion 72. Middle linking portion 74 is coupled to first rising portion 73 in an orientation perpendicular to the upper end edge of first rising portion 73. Middle linking portion 74 is coupled to second rising portion 75 in an orientation perpendicular to the upper end edge of second rising portion 75. Middle linking portion 74 shown in the figures has a substantially fan shape in a plan view. In middle linking portion 74, one side as a boundary edge to first rising portion 73 is coupled to third bent portion 82 facing the first bent portion 81. In middle linking portion 74, another side as a boundary edge to second rising portion 75 is coupled to fourth bent portion 83 facing second bent portion 84. Further, In middle linking portion 74, third bent portion 82 and fourth bent portion 83 are disposed in a crossing orientation, and cut-away portion 85 is provided at a boundary portion between these. Middle linking portion 74 of this structure can be easily deformed by cut-away portion 85.

Additionally, middle linking portion 74 includes a flat surface which is pressed by a jig in a case where bus bar 7 and electrode terminal 13 are welded. In a case where bus bar 7 is formed by press working, dimension error occurs, to a certain extent. For example, first rising portion 73 is designed as follows. First rising portion 73 has a board shape which extends in a direction of the thicknesses of battery cells 1, and is coupled along one end of first connection portion 71 in a vertical orientation. However, these are not necessarily bent at an exactly right angle. When error in manufacturing process is considered, the following is necessary. Bus bar 7 is pressed to electrode terminal 13 at a time of welding bus bar 7, and then first connection portion 71 and second connection portion 72 are in close contact with electrode terminal 13. According to the above-mentioned configuration, in addition to first connection portion 71 and second connection portion 72, the flat surface of middle linking portion 74 is pressed by a jig, and thereby first connection portion 71 and second connection portion 72 can be effectively in close contact with electrode terminal 13. Additionally, holding portion 16 for contacting the undersurface of middle linking portion 74, is provided at a location of the upper end portion of separator 2, corresponding to middle linking portion 74. In this way, by providing holding portion 16 for holding middle linking portion 74, since bus bar 7 is held by holding portion 16 in a case where middle linking portion 74 is pressed by a jig, bus bar 7 can be easily welded.

In bus bar 7, first rising portion 73 in a vertical orientation, which extends in a direction of the thicknesses of battery cells 1, is coupled between first connection portion 71 and middle linking portion 74 via first bent portion 81 and third bent portion 82. By this structure, displacement of first connection portion 71 and second connection portion 72 in the width direction of battery cell 1 (arrow X shown in the figures), can be effectively absorbed. In bus bar 7, second rising portion 75 in a vertical orientation, which extends in a direction of the widths of battery cells 1, is coupled between second connection portion 72 and middle linking portion 74 via second bent portion 84 and fourth bent portion 83. By this structure, displacement of first connection portion 71 and second connection portion 72 in the thickness direction of battery cell 1 (arrow Y shown in the figures), can be absorbed. In bus bar 7, middle linking portion 74 in a horizontal orientation parallel to the first connection portion 71 and the second connection portion 72, is coupled between first rising portion 73 and second rising portion 75 via third bent portion 82 and fourth bent portion 83 which cross each other. By this structure, displacement of first connection portion 71 and second connection portion 72 in the vertical direction (arrow Z shown in the figures), can be absorbed. Further, according to the above-mentioned configuration, since first bent portion 81 and second bent portion 84 are disposed in spaced relationship with each other, press working can be easily carried out, and especially it is advantageous in a case of connecting the thin battery cells.

As shown in FIGS. 6 and 7, bus bar 7 has connecting terminal 78 for detecting a voltage of battery cell 1. In the power supply device having the plurality of battery cells 1 connected in series, electric potentials of electrode terminals 13 in the plurality of battery cells 1 are obtained, and then each of voltages of battery cells 1 is detected from differences of the obtained electric potentials. In bus bar 7 having connecting terminal 78, connecting terminal 78 is connected to voltage detecting line (not shown in figures) of voltage detecting circuit, and then the electric potential of bus bar 7, that is, the electric potential of electrode terminal 13 of battery cell 1 can be obtained. As shown in FIGS. 6 and 7, bus bar 7 of this embodiment has connecting terminal 78 coupled to second connection portion 72. Coupling hole 79 for fixing the voltage detecting line is provided in connecting terminal 78. In second connection portion 72, connecting terminal 78 is coupled to a side other than the side of second bent portion 84. Here, from a view point of space efficiency, it is preferable that connecting terminal 78 extends in a direction (X axis direction) where extending portion 80 of second connection portion 72 extends.

Further, from a view point of workability, preferably, connecting terminal 78 to which the voltage detecting line is fixed, is disposed in a plane substantially parallel to second connection portion 72 and middle linking portion 74. According to this configuration, connecting terminal 78 is located in spaced relationship with electrode terminal 13 of battery cell 1, to which second connection portion 72 is connected. In assembling process, generally, after the bus bar and the electrode terminal of the battery cell are fixed, the bus bar and the voltage detecting line are fixed. Since the connecting terminal is in spaced relationship with the electrode terminal, working space can be secured, and then the voltage detecting line and the bus bar can be easily fixed.

Preferably, bus bar 7 of one embodiment of the present invention is formed by pressing metal board, such that the thicknesses of first bent portion 81, second bent portion 84, third bent portion 82, and fourth bent portion 83 are 0.8 mm or more and 2.0 mm or less. When the thickness of bus bar 7 is too large, since deformation of a portion of first bent portion 81, second bent portion 84, third bent portion 82, fourth bent portion 83, or the like becomes difficult, it becomes difficult that displacement in the pair of electrode terminals 13 connected to bus bar 7 is absorbed. On contrast, when the thickness of the bus bar is too thin, displacement in the pair of electrode terminals 13 connected is absorbed, to a certain extent, even in the conventional configuration. By using the above-mentioned configuration, in a case where the thickness has the above-mentioned scope (0.8 mm or more and 2.0 mm or less), displacement in the pair of electrode terminals 13 can be effectively absorbed. Additionally, bus bar 7 is made of metal which is relatively easily deformed, such as aluminum, or aluminum alloy, and thereby effect of absorbing displacement can be further obtained.

Moreover, in bus bar 7, first connection portion 71 and second connection portion 72 are made of different metals, and made of the same metals as electrode terminals 13 respectively. Bus bar 7 which is connected to electrode terminals 13 made of copper or aluminum, has aluminum board of first connection portion 71, and copper board of second connection portion 72. In bus bar 7 shown in the figures, first rising portion 73, middle linking portion 74, and second rising portion 75 coupled to first connection portion 71 are made of aluminum board. it is connected to second connection portion 72 made of copper board, in close contact at second bent portion 84. Here, second connection portion 72 shown in the figures, has elongated entire length via extending portion 80 extending along a facing edge facing first connection portion 71 toward a central portion of battery cell 1, and thereby connecting length of second connection portion 72 and second rising portion 75 connected at second bent portion 84, is elongated, and then those can be surely connected. Further, only second connection portion 72 is copper board, and the other portion is aluminum board. Thereby, the used amount of expensive copper board can be decreased, and the used amount of inexpensive aluminum board can be increased, and then manufacturing cost can be decreased.

(Separator 2)

Figure 4:
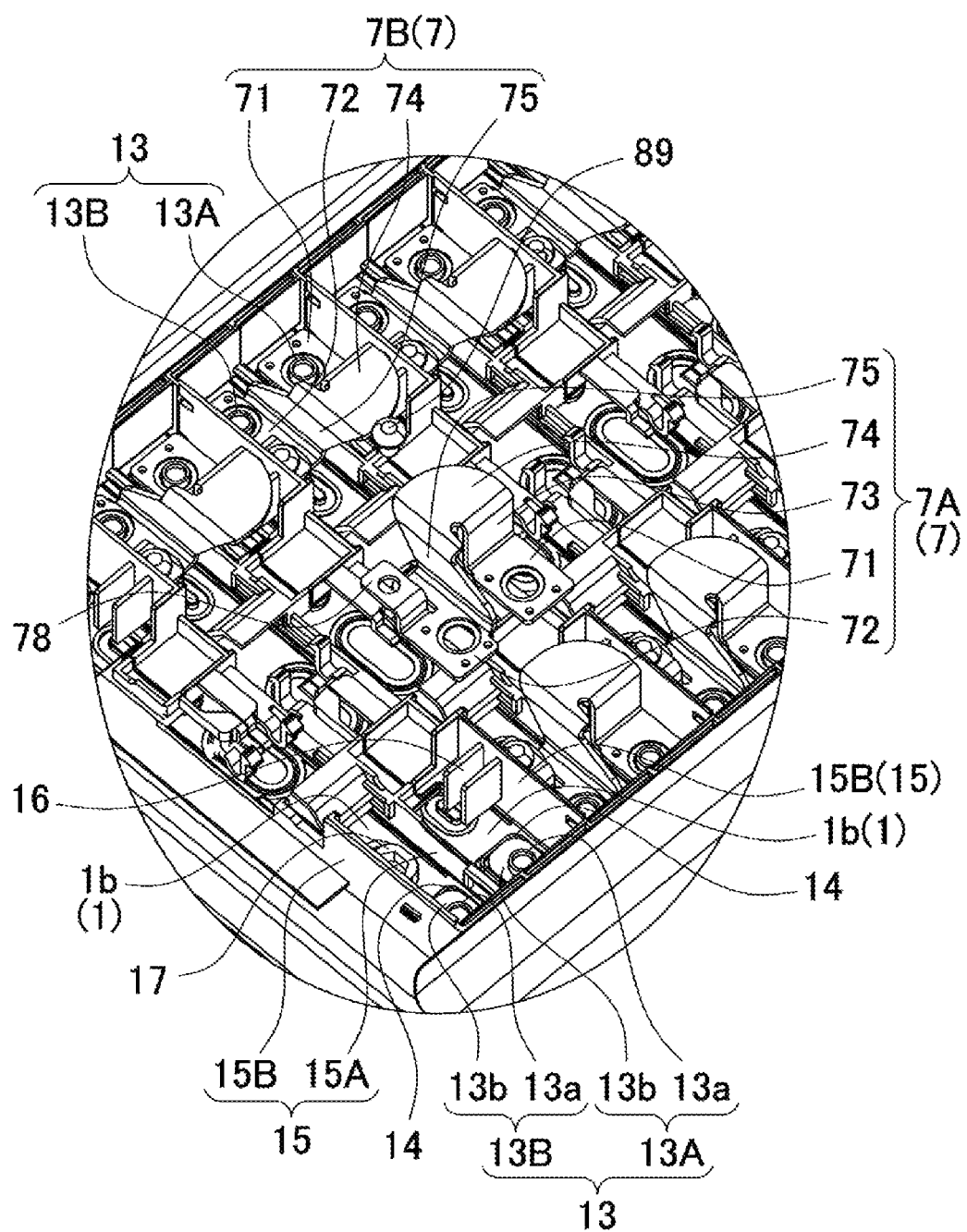
FIG. 4 is an enlarged perspective view illustrating a connecting structure of bus bars of the power supply device illustrated in FIG. 1.
Figure 5:
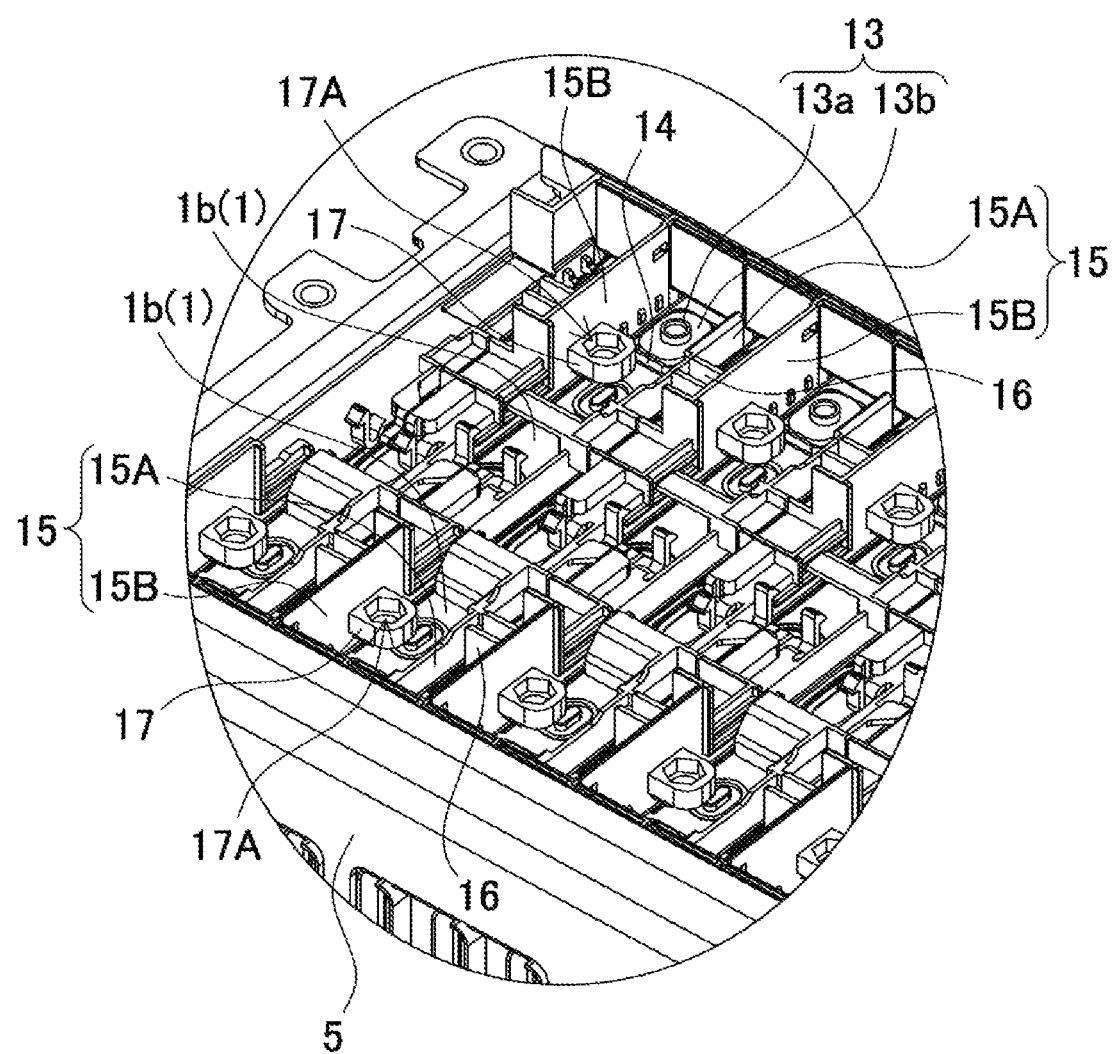
FIG. 5 is a perspective view from an opposite side without the bus bars of the power supply device illustrated in FIG. 4.

In battery stacked body 9, battery cells 1 are stacked such that adjacent battery cells 1 are insulated from each other with insulating separator 2 sandwiched between battery cells 1. Furthermore, battery stacked body 9 is provided with insulating wall 15 between adjacent electrode terminals 13 having a potential difference to increase a creepage distance between adjacent electrode terminals 13 having a potential difference In battery block 50 shown in a sectional view of FIG. 3, insulating wall 15 is unitarily molded with insulating separator 2. Insulating wall 15 is disposed in a predetermined position with separator 2 sandwiched between battery cells 1. Insulating wall 15 is disposed between electrode terminals 13 having a potential difference as shown in FIGS. 3 to 5, and protrudes higher than electrode terminal 13 and preferably higher than the upper end of electrode terminal 13. Insulating walls 15 are disposed high, so that a creepage distance between electrode terminals 13 having a potential difference can be increased.

Insulating wall 15 shown in the figures, is configured of: first insulating wall 15A which is disposed between facing electrode terminals 13 connected by bus bar 7; and second insulating wall 15B which is disposed between adjacent bus bars 7. First insulating wall 15A is formed higher than electrode terminals 13, to insulate adjacent battery cells 1 each other. First insulating wall 15A is formed lower than middle linking portion 74 of bus bar 7 in a state where middle linking portion 74 of bus bar 7 extends across first insulating wall 15A.

Second insulating wall 15B is formed higher than bus bar 7, and prevents adjacent bus bar 7 from being short-circuited due to unintended contact. Second insulating walls 15B partition the upper surface of battery block 50 where the plurality of bus bars 7 are disposed, into a plurality of partition regions, while each of bus bars 7 is disposed at a fixed position. In each of the partition regions, second insulating wall 15B as a boundary partition wall surely insulates bus bars 7 having the difference of electric potentials.

Further, insulating wall 15 shown in FIGS. 4 and 5 has holding rib 16 which holds middle linking portion 74 in one of bus bars 7 by contacting an under surface of middle linking portion 74. In insulating wall 15, holding portion 16 is provided that 2 rows of vertical ribs project from the side surface of second insulating wall 15B toward the upper surface of battery cell 1. In second insulating wall 15B shown in the figures, holding portion 16 projects, such that holding portion 16 faces the end portion where first electrode terminal 13A coupled to first connection portion 71 is provided. This holding portion 16 positions bus bar 7 at the fixed location, while holding the undersurface of middle linking portion 74. Especially, in a case where the flat surface of middle linking portion 74 is pressed by a jig, bus bar 7 can be easily welded by holding portion 16 holding bus bar 7.

Moreover, insulating wall 15 shown in FIGS. 4 and 5 has connection projecting portion 17 which is formed to face the undersurface of connecting terminal 78 projecting from second connection portion 72 of bus bar 7. In insulating wall 15 shown in FIG. 5, connection projecting portion 17 is integrally provided that a projecting portion projects from the side surface opposite to above-mentioned holding portion 16 in second insulating wall 15B toward the upper surface of battery cell 1. In second insulating wall 15B shown in the figures, connection projecting portion 17 projects, such that connection projecting portion 17 faces the end portion where second electrode terminal 13B coupled to second connection portion 72 is provided. This connection projecting portion 17 fixes the voltage detecting line (not shown in figures) by inserting screw 89 into coupling hole 79 of connecting terminal 78. Connection projecting portion 17 shown in FIG. 5 has recess portion 17A at its upper surface, and then a nut (not shown in figures) which is fit into recess portion 17A can be fixed in a non-rotating state. Connecting terminal 78 is disposed at the upper surface of connection projecting portion 17 in a state where bus bar 7 is disposed at the fixed position of battery block 50. The voltage detecting line, for example, has a ring-shaped terminal at the tip thereof, and screw 89 is inserted into the ring-shaped terminal, and then screw 89 passes through coupling hole 79 of connecting terminal 78, and screw 89 is screwed into the nut. Therefore, the voltage detecting line is simply, easily, and surely fixed to connecting terminal 78.

The power supply device and the power supply system described above are used for various purposes, such as a power supply mounted on a powered vehicle such as a hybrid car or an electric vehicle for supplying power to a travel motor, a power supply for storing power generated by natural energy such as photovoltaic power generation or wind-power generation, or a power supply for storing night power, and are particularly used as a power supply preferable for large power and large current.

Exemplary embodiments and examples of the present invention have been described with reference to the drawings. The exemplary embodiments and examples show devices for embodying the technical ideas of the present invention. The present invention is not limited to the above-mentioned devices. In the present description, members shown in the scope of claims are not limited to the members of the exemplary embodiments. Especially, the sizes, materials, and shapes of the components and relative arrangement between the components, which are described in the exemplary embodiments, do not limit the scope of the present invention but are simply explanation examples as long as there is no specific description. The sizes and the positional relation of the members in each drawing are sometimes exaggerated for clearing the explanation. Furthermore, in the above-mentioned explanation, the same names or the same reference marks denote the same members or same-material members, and detailed description is appropriately omitted. Furthermore, regarding the elements constituting the present invention, a plurality of elements may be formed of the same member, and one member may serve as the plurality of elements. Conversely, the function of one member may be shared by the plurality of members.

The battery system according to the present invention is optimally used for a power supply device that supplies power to a motor of a vehicle which requires large power or a power storage device that stores natural energy or night power.

The invention claimed is:

1. A power supply device comprising:
a plurality of battery cells each having a positive electrode terminal and a negative electrode terminal; and
a bus bar which electrically connects the electrode terminals facing each other in the battery cells adjacently disposed among the plurality of battery cells,
wherein the bus bar includes:
a first connection portion which is connected to one of the electrode terminals;
a second connection portion which is connected to another of the electrode terminals;
a first rising portion which is coupled to the first connection portion through a first bent portion;
a second rising portion which is coupled to the second connection portion through a second bent portion, and is disposed in an orientation of crossing the first rising portion; and
a middle linking portion which is coupled to the first rising portion through a third bent portion facing the first bent portion, and the second rising portion through a fourth bent portion facing the second bent portion;
wherein each of the battery cells is a rectangular battery having a thickness smaller than a width,
wherein, in the bus bar, the first connection portion and the second connection portion are disposed in a substantially same plane, and the middle linking portion is disposed in a plane substantially parallel to the first connection portion and the second connection portion,
wherein the first rising portion has a board shape extending in a direction of the thicknesses of the battery cells, and is coupled along one end of the first connection portion in a vertical orientation, and
wherein the second rising portion has a board shape extending in a direction of the widths of the battery cells, and is coupled along a facing edge facing the first connection portion at a side edge of the second connection portion in a vertical orientation.

2. The power supply device according to claim 1, wherein the bus bar has a thickness of 0.8 mm or more and 2.0 mm or less, at least at the first bent portion, the second bent portion, the third bent portion, and the fourth bent portion.

3. The power supply device according to claim 1, wherein in the bus bar, the second connection portion has an extending portion which projects along a facing edge facing the first connection portion, and the second rising portion extends along the extending portion.

4. The power supply device according to claim 1, wherein the bus bar has a connecting terminal which projects from one end of the second connection portion.

5. The power supply device according to claim 1, wherein the battery cells are rectangular batteries, and each of the battery cells has a first electrode terminal as the positive electrode terminal and a second electrode terminal as the negative electrode terminal at both of end portions of an upper surface of each of the battery cells, and the plurality of the rectangular batteries are disposed in a stacked state, and the first electrode terminal is connected to the first connection portion and the second electrode terminal is connected to the second connection portion at the end portion of each of the battery cells adjacently disposed, and thereby the plurality of the battery cells are connected in series through the bus bar.

6. The power supply device according to claim 1, wherein the bus bar is made of aluminum or aluminum alloy.

7. The power supply device according to claim 1, further comprising:
a separator having insulation property interposed between secondary battery cells adjacently disposed in a state where the secondary battery cells are stacked,
wherein the separator has an insulating wall which is disposed between the first electrode terminal and the second electrode terminal connected to each other through the bus bar, and
the insulating wall is formed so as to be higher than the electrode terminals and lower than the middle linking portion.

8. The power supply device according to claim 1, further comprising:
separators having insulation property interposed between secondary battery cells adjacently disposed in a state where the secondary battery cells are stacked; and
wherein the bus bar is one of a plurality of bus bars,
wherein one of the separators which is disposed between the adjacent bus bars has an insulating wall, and
wherein the insulating wall is formed so as to be higher than the bus bars.

9. The power supply device according to claim 1, wherein in the bus bar, the first connection portion and the second connection portion have through holes in which the first electrode terminal and the second electrode terminal are inserted respectively, and the first connection portion and the second connection portion are respectively connected by welding to the first electrode terminal and the second electrode terminal.

10. The power supply device according to claim 9, wherein the middle linking portion includes a flat surface which is pressed by a jig in a case where the first connection portion and the second connection portion are welded.

11. The power supply device according to claim 9, wherein in the bus bar, the first connection portion and the second connection portion are made of different metal materials, and the bus bar is a clad material where the first connection portion and the second connection portion are connected.

12. The power supply device according to claim 11, wherein the battery cells are rectangular batteries, and each of the battery cells has a first electrode terminal as the positive electrode terminal and a second electrode terminal as the negative electrode terminal at both of end portions of an upper surface of each of the battery cells, and the first electrode terminal is made of aluminum, and the second electrode terminal is made of copper, and in the bus bar, the first connection portion is made of aluminum, and the second connection portion is made of copper.

13. A power supply device comprising:
a plurality of battery cells each having a positive electrode terminal and a negative electrode terminal;
a bus bar which electrically connects the electrode terminals facing each other in the battery cells adjacently disposed among the plurality of battery cells; and
separators having insulation property which are interposed between secondary battery cells adjacently disposed in a state where the secondary battery cells are stacked;
wherein the bus bar includes:
a first connection portion which is connected to one of the electrode terminals;
a second connection portion which is connected to another of the electrode terminals;
a first rising portion which is coupled to the first connection portion through a first bent portion;
a second rising portion which is coupled to the second connection portion through a second bent portion, and is disposed in an orientation of crossing the first rising portion; and
a middle linking portion which is coupled to the first rising portion through a third bent portion facing the first bent portion, and the second rising portion through a fourth bent portion facing the second bent portion;
wherein the bus bar is one of a plurality of bus bars,
wherein one of the separators which is disposed between adjacent bus bars has an insulating wall,
wherein the insulating wall is formed so as to be higher than the bus bars, and
wherein the insulating wall has a holding rib which holds the middle linking portion in one of the bus bars by contacting an under surface of the middle linking portion.

* * * * *